US009383105B2

(12) United States Patent
Naeve

(10) Patent No.: US 9,383,105 B2
(45) Date of Patent: Jul. 5, 2016

(54) COMPRESSED AIR ENERGY STORAGE SYSTEM HAVING VARIABLE GENERATION MODES

(71) Applicant: APEX COMPRESSED AIR ENERGY STORAGE, LLC, Houston, TX (US)

(72) Inventor: Stephen Ward Naeve, Houston, TX (US)

(73) Assignees: APEX COMPRESSED AIR ENERGY STORAGE, LLC, Houston, TX (US); Dresser-Rand Company, Olean, NY (US)

( * ) Notice: Subject to any disclaimer, the term of this patent is extended or adjusted under 35 U.S.C. 154(b) by 361 days.

(21) Appl. No.: 13/941,200

(22) Filed: Jul. 12, 2013

(65) Prior Publication Data

US 2014/0026584 A1    Jan. 30, 2014

Related U.S. Application Data

(60) Provisional application No. 61/677,178, filed on Jul. 30, 2012.

(51) Int. Cl.
*F02C 6/16*  (2006.01)
*F23R 3/02*  (2006.01)
*F02C 7/143* (2006.01)

(52) U.S. Cl.
CPC ... *F23R 3/02* (2013.01); *F02C 6/16* (2013.01); *F02C 7/143* (2013.01); *Y02E 60/15* (2013.01)

(58) Field of Classification Search
CPC .............. F02C 6/14; F02C 6/16; F02C 7/143; F23R 3/02; Y02E 60/15; F05D 2260/211

USPC .......... 60/727, 726, 728, 773, 774, 778, 792, 60/39.17
See application file for complete search history.

(56) References Cited

U.S. PATENT DOCUMENTS

| 4,312,179 | A | * | 1/1982 | Zaugg | F02C 6/16 60/774 |
| 4,403,477 | A | * | 9/1983 | Schwarzenbach | F02C 6/16 60/398 |
| 4,522,024 | A | * | 6/1985 | Zaugg | F01K 21/047 60/727 |
| 4,630,436 | A | | 12/1986 | Frutschi | |
| 5,379,589 | A | * | 1/1995 | Cohn | F01B 17/00 60/39.59 |
| 5,488,823 | A | * | 2/1996 | Faulkner | F02B 43/00 60/39.183 |
| 5,537,822 | A | * | 7/1996 | Shnaid | F02C 6/04 60/650 |

(Continued)

FOREIGN PATENT DOCUMENTS

WO    92/22741 A1    12/1992

OTHER PUBLICATIONS

PCT International Search Report and Written Opinion dated Dec. 3, 2013, International Application No. PCT/US2013/051093.

*Primary Examiner* — Steven Sutherland

(57) ABSTRACT

A method of operating a compressed air energy storage (CAES) system includes operating a compressor train of the CAES system, thereby compressing air. The method further includes, while operating the compressor train: inter-cooling a first portion of the compressed air; further compressing the inter-cooled first portion; after-cooling the further compressed first portion; supplying the after-cooled first portion to a storage vessel; supplying a second portion of the compressed air to a combustor; combusting the second portion; and operating a turbine train of the CAES system using the combusted second portion.

18 Claims, 3 Drawing Sheets

(56) References Cited

U.S. PATENT DOCUMENTS 5,778,675 A 7/1998 Nakhamkin
5,934,063 A * 8/1999 Nakhamkin ............ F02C 6/06
  60/727
7,104,071 B2 * 9/2006 Braun .................... F02C 7/141
  60/39.26

* cited by examiner

COMPRESSED AIR ENERGY STORAGE SYSTEM HAVING VARIABLE GENERATION MODES

BACKGROUND OF THE INVENTION

1. Field of the Invention

Embodiments of the present invention generally relate to a compressed air energy system having variable generation modes.

2. Description of the Related Art

Compressed air energy storage (CAES) is a historically proven method of "storing" electric energy for later supply to the bulk power grid. The first utility scale CAES facility began service in 1978, in Huntorff, Germany, with a second plant in McIntosh, Ala., going into service in 1991. CAES plants compress air with an electric motor-driven compressor, injecting the air at high pressure into an underground storage cavern. Subsequently, when power is needed for the grid, high-pressure air from the cavern is routed through one or more expansion turbines, performing work and driving an electric generator, producing power for the grid.

In these initial applications, CAES was implemented to produce cost-effective peak power by shifting low-cost, off-peak energy into high demand hours. One distinctive feature of these initial CAES installations was the use of a single electrical machine to function as a motor to drive the compression train, and as a generator when withdrawing air from the cavern. This was accomplished by linking the "motor/generator" via clutches to a compressor train and to the expanders. One clutch would always be engaged, with the other disengaged, allowing either function to be performed by this single electrical machine. The advantage of this design is the avoidance of an additional large electrical machine (i.e., a motor or a generator).

SUMMARY OF THE INVENTION

Embodiments of the present invention generally relate to a compressed air energy system having variable generation modes. In one embodiment, a method of operating a compressed air energy storage (CAES) system includes operating a compressor train of the CAES system, thereby compressing air. The method further includes, while operating the compressor train: inter-cooling a first portion of the compressed air; further compressing the inter-cooled first portion; after-cooling the further compressed first portion; supplying the after-cooled first portion to a storage vessel; supplying a second portion of the compressed air to a combustor; combusting the second portion; and operating a turbine train of the CAES system using the combusted second portion.

In another embodiment, a compressed air energy storage (CAES) system includes: an electric motor; a compressor train connected to the electric motor via a first drive shaft; an intercooler and aftercooler in fluid communication with the compressor train; an electric generator; a turbine train connected to the electric generator via a second drive shaft; a combustor in fluid communication with the turbine train; and a programmable logic controller (PLC). The PLC is operable to: divert a portion of air from the compressor train to the combustor at a first flow rate, supply fuel to the combustor at a second flow rate, and control the first flow rate and the second flow rate to operate the turbine train at or near minimum capacity.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1A illustrates the CAES system in a low power generation mode. FIG. 1B illustrates the CAES system in an emergency power generation mode. FIG. 1C illustrates the CAES system in a high power generation mode.

DETAILED DESCRIPTION

Figure 1A:
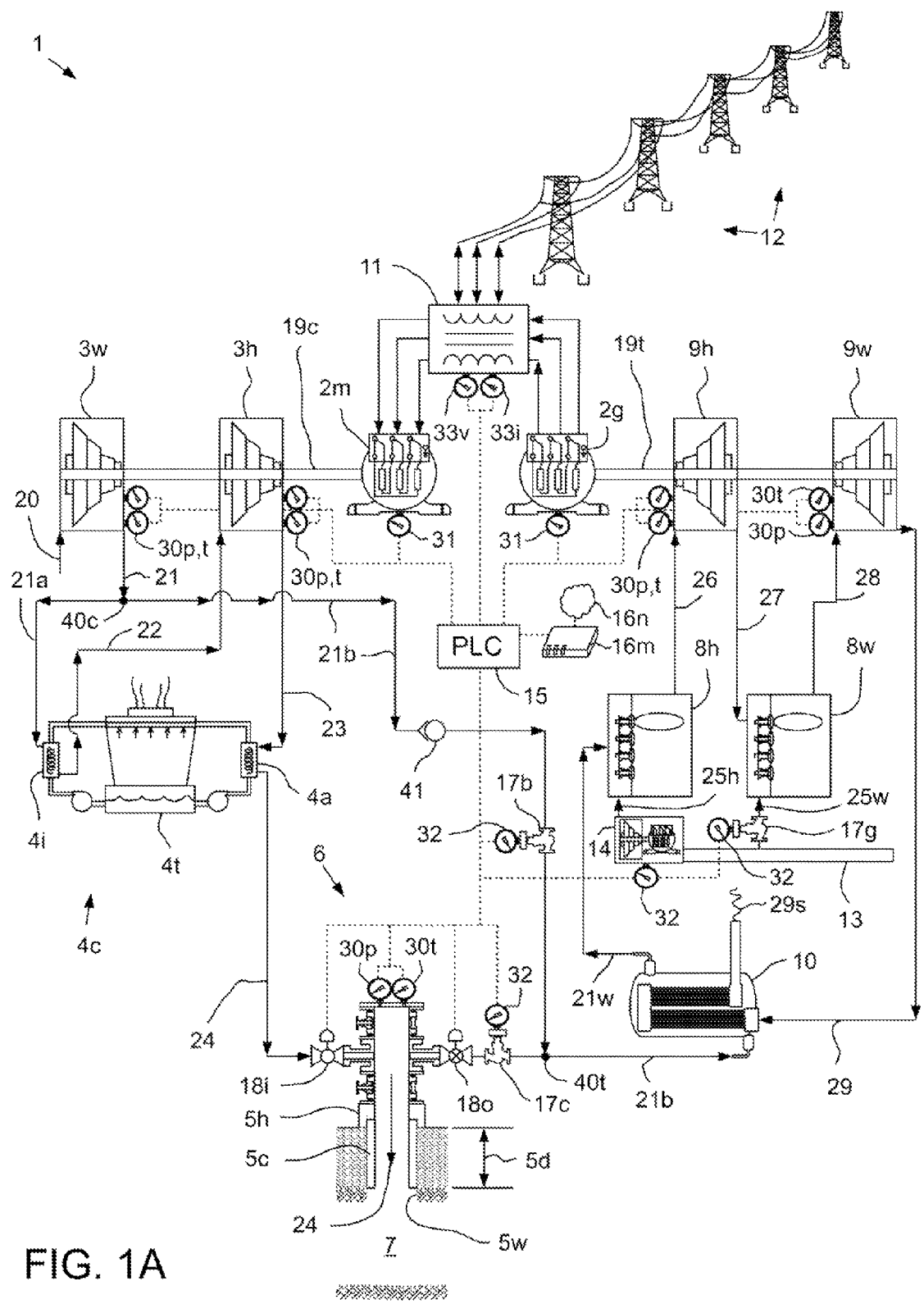
FIGS. 1A-1C illustrate a compressed air energy storage (CAES) system operating in various modes, according to embodiments of the present invention.
Figure 1B:
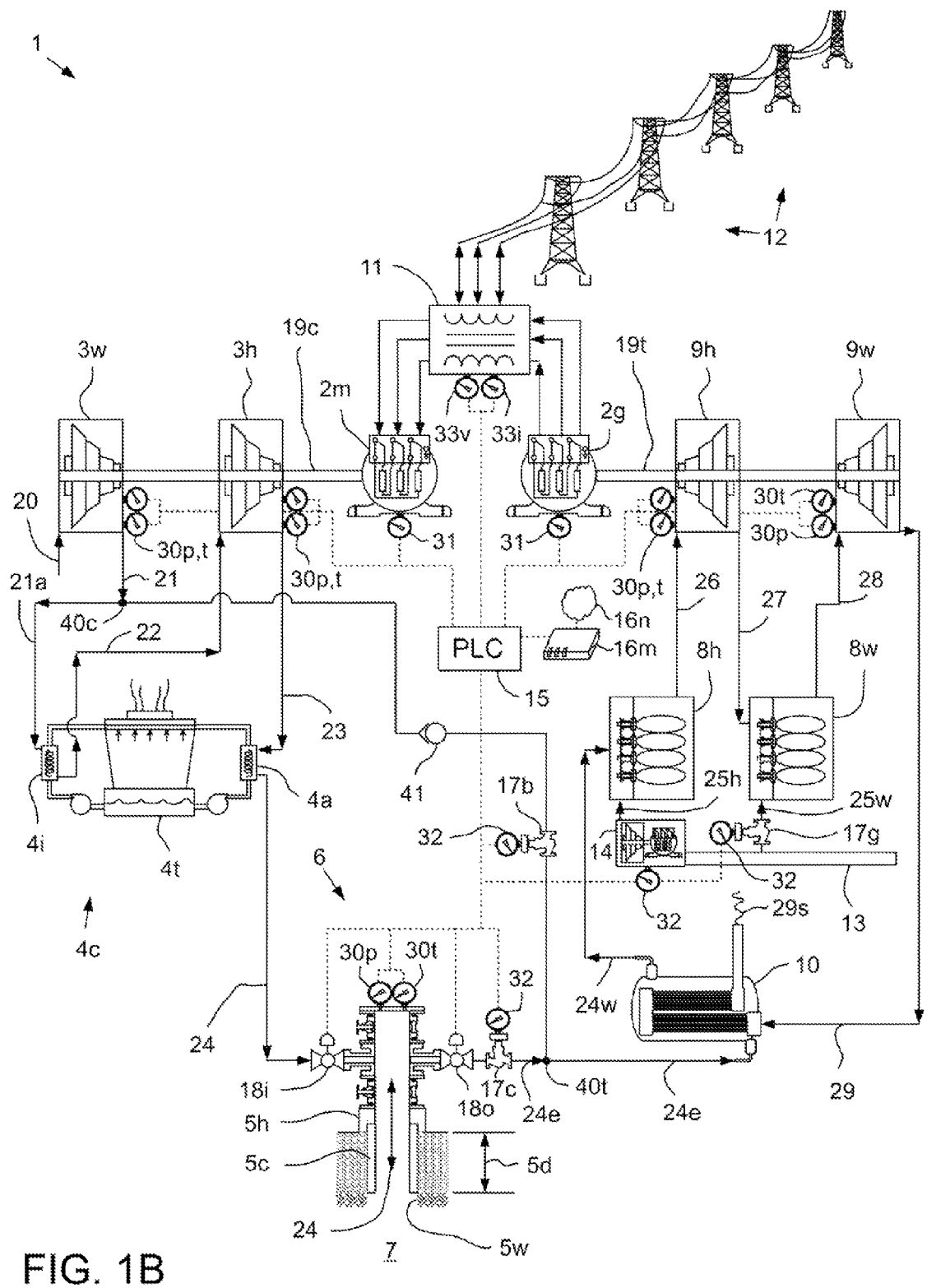
Figure 1C:
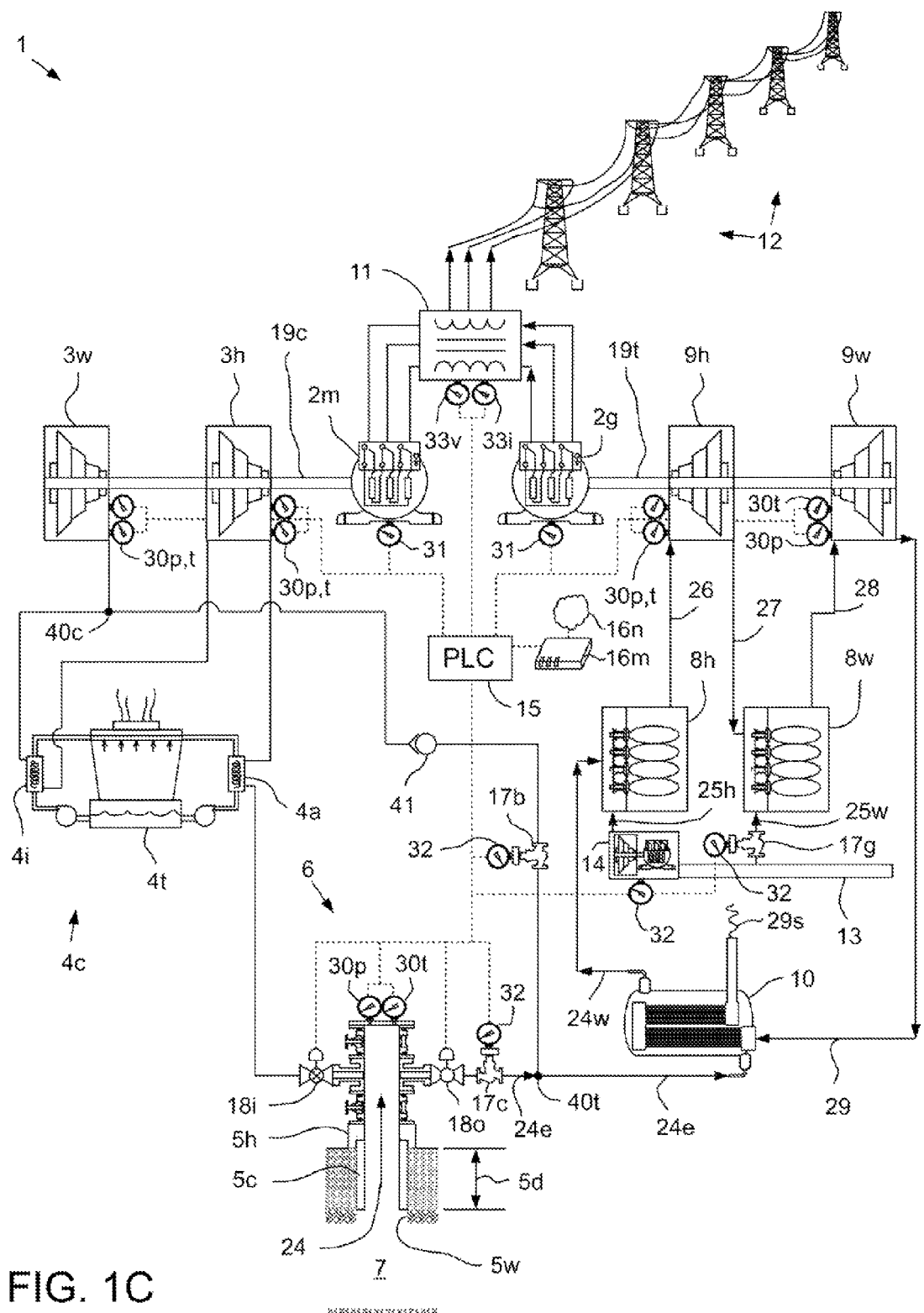

FIGS. 1A-1C illustrate a compressed air energy storage (CAES) system 1 operating in various modes, according to embodiments of the present invention. FIG. 1A illustrates the CAES system 1 in a low power generation mode. The CAES system 1 may include an electric motor 2$m$, an electric generator 2$g$, a compressor train 3$w,h$, a cooling system 4$c$, storage vessel 7, one or more combustors 8$h,w$, a turbine train 9$h,w$, a recuperator 10, a transformer 11, a programmable logic controller (PLC) 15, and one or more control valves 17$b,c,g$.

The storage vessel 7 may be a subterranean geological space, such as a salt dome, cavern, or mine. Alternatively, the storage vessel may be a pressure vessel located on the surface or underground. A wellbore 5$w$ may provide communication between the storage vessel 7 and a wellhead 5$h$. A casing string 5$c$ may be installed in the wellbore 5$w$ by being hung from the wellhead 5$h$ and cemented (not shown) in place. Once the casing string 4 has been deployed and cemented, a header 6 may be fastened to the wellhead 5$h$. The header 6 may include one or more shutoff valves, a flow cross, and a cap. An inlet valve 18$i$ and an outlet valve 18$o$ may each be fastened to a respective branch of the header flow cross. Each inlet and outlet valve 18$i,o$ may be an automated shutoff valve having a powered actuator. The valve actuators may each be hydraulically, electrically, or pneumatically powered and may be in communication with the PLC 15 for operation of the respective inlet and outlet valves 18$i,o$ by the PLC 15.

The transformer 11 may be connected to transmission lines of an electric grid 12. The transformer 11 may be a one or more (three shown) phase transformer for stepping voltage supplied by the generator 2$g$ from an output voltage to a substation or transmission line voltage. The transformer 11 may also step a substation or transmission line voltage from the power grid 12 to an input voltage for supplying the electric motor 2$m$. Alternatively, the CAES system 1 may include a first transformer for the electric motor 2$m$ and a second transformer for the electric generator 2$g$. A first drive shaft 19$c$ may connect a rotor of the electric motor 2$m$ to a rotor of the compressor train 3$w,h$ for torsional driving of the compressor train 3$w,h$ by the electric motor 2$m$. A second drive shaft 19$t$ may connect a rotor of the electric generator 2$g$ to a rotor of the turbine train 9$h,w$ for torsional driving of the electric generator 2$g$ by the turbine train 9$h,w$.

The compressor train 3$w,h$ may include two or more compressors connected in series, such as low pressure compressor 3$w$ and high pressure compressor 3$h$. The low pressure compressor 3$w$ may intake ambient air 20 and compress the ambient air 20. The cooling system 4$c$ may include a cooling tower 4$t$, an intercooler 4$i$, an aftercooler 4$a$, piping, circulation pumps, and a coolant, such as water.

The compressed air 21 may be discharged from the low pressure compressor 3w to an inlet of a first tee 40c having a pair of outlet branches. A first portion 21a of the compressed air 21 may flow through a first branch of the first tee 40c to the intercooler 4i. A second portion 21b of the compressed air 21 may flow through a second branch of the first tee 40c to an inlet of the recuperator 10. The intercooler 4i may transfer heat from the first portion 21a to the cooling tower 4t. The cooled compressed air 22 may be discharged from the intercooler 4i to an inlet of the high pressure compressor 3h. The high pressure compressor 3h may further compress the cooled compressed air 22. The further compressed air 23 may be discharged from the high pressure compressor 3h to the aftercooler 4a. The aftercooler 4a may transfer heat from the further compressed air 23 to the cooling tower 4t such that a temperature of the further cooled and further compressed air 24 is suitable for discharge into the storage vessel 7. The further cooled and further compressed air 24 may be discharged from the aftercooler 4a through the inlet valve 18i, down the casing string 5c and into the storage vessel 7.

To facilitate optimal control of the CAES system 1 by the PLC 15, the CAES system 1 may include one or more sensors, such as one or more (five shown) pressure sensors 30p, one or more (five shown) temperature sensors 30t, one or more (two shown) tachometers 31, one or more (four shown) flow meters 32, a voltmeter 33v and an ammeter 33i. Each sensor 30p,t-33v,i may be in data communication with the PLC 15. The PLC 15 may also be in communication with the grid operator via a network 16n, such as an intranet or the Internet, and a network interface, such as a modem 16m. The PLC 15 may also monitor the sensors 30p,t-33v,i to determine if any of the CAES equipment requires maintenance.

The PLC 15 may maintain a charge pressure of the storage vessel 7 between a minimum and a maximum charge pressure. The maximum charge pressure may be determined from a depth 5d of a bottom (aka shoe) of the casing string 5c. The casing shoe depth 5d may be greater than or equal to about 1,000, about 1,500, about 2,000, about 2,500, about 3,000, or about 3,500 feet. The maximum charge pressure (in psia) may be based on a percentage of the casing shoe depth 5d (in feet), such as eighty-five percent of the casing shoe depth 5d (measured at the casing shoe depth 5d, slightly less if measured at the wellhead 5h due to head pressure). The minimum charge pressure (in psia) may also be based on a percentage of the casing shoe depth 5d (in feet), such as greater than or equal to: forty-five percent, fifty percent, sixty percent, seventy percent, or seventy-five percent of the casing shoe depth 5d (measured at the casing shoe depth 5d, slightly less if measured at the wellhead 5h due to head pressure).

For example, for a casing shoe depth 5d equal to 3,750 feet, the maximum charge pressure may be 3,188 psia (at casing shoe depth 5d, about 2,850 psia at the wellhead 5h) and the minimum charge pressure may be 2,500 psia (at casing shoe depth 5d, about 2,300 psia at the wellhead 5h). Alternatively, the minimum charge pressure may be based on the required charge pressure to achieve the rated output of the turbine train 9h,w for a predetermined period of time, such as greater than or equal to one hour, two hours, four hours, eight hours, or twelve hours, and may be substantially greater than the required charge pressure to achieve the rated output.

A flow rate of the second portion 21b of the compressed air 21 to the recuperator 10 may be regulated by a bypass control valve 17b. The recuperator 10 may preheat the second portion 21b of the compressed air 21. The preheated second portion 21w of the compressed air 21 may be discharged from the recuperator 10 to an air inlet of a high pressure combustor 8h. The high pressure combustor 8h may also receive high pressure fuel gas 25h from a booster compressor 14. The booster compressor 14 may be supplied by a fuel supply, such as a pipeline 13. A flow rate of the high pressure fuel gas 25h may be regulated by the PLC 15 controlling operation of the booster compressor 14. The high pressure fuel gas 25h may be natural gas, propane, butane, methane, or syngas.

The high pressure combustor 8h may mix the high pressure fuel gas 25h with the preheated second portion 21w of the compressed air 21 and combust the mixture, thereby further heating the preheated second portion 21w of the compressed air 21. The turbine train 9h,w may include two or more gas turbines connected in series, such as low pressure turbine 9w and high pressure turbine 9h. The heated exhaust gas 26 may be discharged from the high pressure combustor 8h to the high pressure turbine 9h. The high pressure turbine 9h may intake and expand the heated exhaust gas 26 while harnessing energy therefrom to drive the generator 2g. The expanded exhaust gas 27 may be discharged from the high pressure turbine 9h to a low pressure combustor 8w.

The low pressure combustor 8w may receive low pressure fuel gas 25w from the pipeline 13 via control valve 17g. The low pressure fuel gas 25w may be natural gas, propane, butane, methane, or syngas. A flow rate of the low pressure fuel gas 25w may be regulated by the PLC 15 controlling operation of the control valve 17g. The low pressure combustor 8w may mix the low pressure fuel gas 25w with the expanded exhaust gas 27 and combust the mixture, thereby reheating the expanded exhaust gas 27. The reheated exhaust gas 28 may be discharged from the low pressure combustor 8w to the low pressure turbine 9w. The low pressure turbine 9w may intake and expand the reheated exhaust gas 28 while harnessing energy therefrom to drive the generator 2g. The flue gas 29 may be discharged from the low pressure turbine 9w to the recuperator 10. The recuperator 10 may utilize residual heat from the flue gas 29 for preheating the second portion 21b of the compressed air 21. The spent flue gas 29s may be discharged from the recuperator 10 to the atmosphere.

In the low power generation mode, assuming the storage vessel 7 is depleted or substantially depleted, the PLC 15 may operate the compressor train 3w,h at or near rated capacity and the turbine train 9h,w at or near minimum capacity due to off-peak pricing of electricity by the grid operator. If/when the storage vessel 7 is recharged or nearly recharged, the PLC 15 may reduce compressor output to the flow rate necessary to operate the turbine train 9h,w at minimum capacity by control of the electric motor 2m. If/when the storage vessel 7 is fully recharged, the PLC 15 may shut the inlet valve 18i.

The PLC 15 may continue operating the turbine train 9h,w at minimum capacity for the duration of the low power generation mode such that the CAES system 1 may qualify for consideration as spinning reserve capacity by being able to rapidly increase output of the turbine train 9h,w to a requested, such as rated, capacity. The response time may be predetermined by the grid operator, such as less than or equal to five or ten minutes. The grid operator typically maintains spinning reserve capacity in case of generation or transmission outages. The CAES system 1 may be online when operating as spinning reserve capacity and may or may not be frequency responsive. Alternatively, the CAES system 1 may be operated as supplemental reserve capacity. The minimum capacity of the turbine train 9h,w may be substantially less than the rated capacity, such as less than or equal to one-tenth the rated capacity or ranging between one percent and five percent of the rated capacity.

A rated output of the turbine train 9h,w may be based on the useful capacity of the storage vessel 7. The useful capacity may be the difference between the maximum and minimum charge pressures of the storage vessel 7. The turbine train 9h,w rated capacity may be designed to consume the useful storage vessel capacity within a predetermined period of time, such as: eight hours, twelve hours, eighteen hours, one day, two days, or four days. A rated capacity of the compressor train 3w,h may also correspond to the useful capacity of the storage vessel 7. The rated output of the compressor train 3w,h may be designed to recharge the useful storage vessel capacity within a predetermined period of time, such as: six hours, eight hours, twelve hours, eighteen hours, one day, two days, or four days.

A flow rate of the second portion 21b may be greater than or equal to the flow rate necessary to operate the turbine train 9h,w at minimum capacity. In terms relative to the flow rate of the compressed air 21 (at rated capacity of the compressor train 3w,h), the flow rate of the second portion 21b may range between: about one-eighth to about one-half, about one-sixth to about one-third, or be about one-fourth. A pressure of the second portion 21b may be greater than or equal to the pressure necessary to operate the turbine train 9h,w at minimum capacity, such as, for example, about one hundred psia, about one hundred fifty psia, or about two hundred psia, and substantially less than the minimum charge pressure of the storage vessel 7, such as less than or equal to about one-third, about one-fourth, about one-fifth, about one-sixth, or about one-eighth of the minimum charge pressure. If the compressor train 3w,h includes one or more intermediate compressors (not shown), then the second portion 21b may be diverted from the compressor having an outlet pressure closest to and greater than the turbine train minimum operating pressure. For example, a four-compressor train may have the second portion 21b diverted from an outlet of the second compressor.

FIG. 1B illustrates the CAES system 1 in an emergency power generation mode. If the grid operator requests implementation of the spinning reserve capacity, the PLC 15 may rapidly increase output, such as to rated capacity, of the turbine train 9h,w within the predetermined period of time dictated by the grid operator. The PLC 15 may open the outlet valve 18o, thereby releasing the further cooled and further compressed stored air 24 from the storage vessel 7. The further cooled and further compressed stored air 24 may exit the header flow cross and flow through the control valve 17c. As discussed above, the minimum charge pressure of the storage vessel 7 may be substantially greater than the pressure for rated operation of the turbine train 9h,w such that substantial expansion may occur through the control valve 17c.

The expanded released air 24e may be discharged from the control valve 17c to the recuperator 10 via a second tee 40t. The expanded released air 24e may substantially increase pressure at the second tee 40t relative to the discharge pressure of the low pressure compressor 3w, thereby shutting check valve 41. The expanded released air 24e may be preheated by the recuperator 10 and the preheated released air 24w may be discharged to the high pressure combustor 8h. The PLC 15 may increase the flow rate of the booster compressor 14 and control valve 17g according to the flow rate of the preheated released air 24w. The PLC 15 may adjust operation of the compressor train 3w,h and/or the cooling system 4c in response to closing of the check valve 41. Operation of the CAES system 1 in emergency mode may continue as required by the grid operator.

Since the turbine train 9h,w and compressor train 3w,h are operated independently via the respective electric generator 2g and electric motor 2m, the PLC 15 may respond to various forms of requests by the grid operator by independently increasing or decreasing capacity of the compressor train 3w,h and turbine train 9h,w. Such requests may include frequency regulation, such as up-regulation or down-regulation, or other (in addition to spinning reserves) ancillary services. Additionally, instead of (or in addition to) increasing generation by the turbine train 9h,w, the PLC 15 may decrease consumption by the compressor train 3w,h to create an equivalent net (or cumulative) effect.

FIG. 1C illustrates the CAES system 1 in a high power generation mode. In response to increase of electricity price to peak-level, the PLC 15 may transition the turbine train 9h,w to operation from the storage vessel 7, as discussed above. The PLC 15 may then shut down the compressor train 3w,h and close the inlet valve 18i. The PLC 15 may operate the turbine train 9h,w at full or partial capacity depending on the requirements of the grid operator.

Alternatively, the CAES system may include a boiler or steam generator and a steam turbine train instead of the recuperator 10 for utilizing residual heat of the flue gas.

While the foregoing is directed to embodiments of the present invention, other and further embodiments of the invention may be devised without departing from the basic scope thereof, and the scope thereof is determined by the claims that follow.

The invention claimed is:

1. A method of operating a compressed air energy storage (CAES) system, comprising:
   operating a compressor train of the CAES system, thereby compressing air to produce compressed air; and
   while operating the compressor train:
      compressing the air in a first compressor of the compressor train to produce the compressed air;
      inter-cooling a first portion of the compressed air to produce an inter-cooled first portion;
      further compressing the inter-cooled first portion in a second compressor of the compressor train coupled with the first compressor via a drive shaft to produce a further compressed first portion;
      after-cooling the further compressed first portion to produce an after-cooled first portion;
      supplying the after-cooled first portion to a storage vessel;
      preheating a second portion of the compressed air in a recuperator to produce a preheated second portion of the compressed air;
      supplying the preheated second portion of the compressed air to a combustor;
      combusting the preheated second portion of the compressed air in the combustor to produce a combusted second portion; and
      operating a turbine train of the CAES system using the combusted second portion.

2. The method of claim 1, wherein the turbine train is operated at a minimum capacity.

3. The method of claim 2, wherein a flow rate of the second portion of the compressed air is one-sixth to one-third of a flow rate of the compressed air.

4. The method of claim 3, wherein a pressure of the second portion of the compressed air is at least 150 psia.

5. The method of claim 1, further comprising while operating the compressor train:
   supplying stored air from the storage vessel to the combustor;
   ceasing supply of the second portion of the compressed air to the combustor in response to supplying the stored air;
   combusting the stored air; and
   operating the turbine train using a combusted stored air.

6. The method of claim 5, further comprising expanding the stored air before supplying the combustor.

7. The method of claim 1, wherein:
the compressor train is operated by an electric motor; and
the turbine train operates an electric generator.

8. The method of claim 1, wherein the storage vessel is a salt dome, cavern, or mine.

9. The method of claim 8, wherein a casing shoe depth of the storage vessel is at least 1,000 feet.

10. The method of claim 9, further comprising maintaining a minimum charge pressure of the storage vessel, wherein the minimum charge pressure (in psia) is at least 45% of the casing shoe depth (in feet).

11. The method of claim 10, wherein a pressure of the second portion of the compressed air is less than or equal to one-fourth of the minimum charge pressure.

12. A compressed air energy storage (CAES) system, comprising:
an electric motor;
a compressor train connected to the electric motor via a first drive shaft and comprising one or more low pressure compressors and one or more high pressure compressors coupled with the first drive shaft;
an intercooler fluidly coupled with and disposed downstream from the one or more low pressure compressors via a first line;
an aftercooler fluidly coupled with and disposed downstream from the one or more high pressure compressors;
a recuperator fluidly coupled with and disposed downstream from the one or more low pressure compressors via a second line;
a check valve fluidly coupled with the second line between the one or more low pressure compressors and the recuperator;
a bypass control valve fluidly coupled with the second line between the check valve and the recuperator;
an electric generator;
a turbine train connected to the electric generator via a second drive shaft;
a combustor fluidly coupled with and disposed downstream from the recuperator and upstream of the turbine train;
a storage vessel fluidly coupled with and disposed downstream from the aftercooler; and
a programmable logic controller (PLC) operable to:
divert a portion of air from the compressor train to the combustor at a first flow rate,
supply fuel to the combustor at a second flow rate, and
control the first flow rate and the second flow rate to operate the turbine train at a minimum capacity.

13. The compressed air energy storage (CAES) system of claim 12, wherein the storage vessel is in fluid communication with the compressor train and the recuperator.

14. A compressed air energy storage system, comprising:
a compressor train configured to compress air and comprising:
a first compressor coupled with a first rotary shaft;
a second compressor coupled with the first rotary shaft; and
an electric motor coupled with the first rotary shaft;
an intercooler fluidly coupled with and disposed downstream from the first compressor via a first line;
an aftercooler fluidly coupled with and disposed downstream from the second compressor;
a storage vessel fluidly coupled with and disposed downstream from the aftercooler;
a recuperator fluidly coupled with and disposed downstream from the first compressor via a second line, and further disposed downstream from the storage vessel via a third line;
a check valve fluidly coupled with the second line between the first compressor and the recuperator;
a bypass control valve fluidly coupled with the second line between the check valve and the recuperator;
a combustor fluidly coupled with and disposed downstream from the recuperator;
a turbine train fluidly coupled with and disposed downstream from the combustor; and
an electric generator coupled with the turbine train via a second rotary shaft.

15. The compressed air energy storage system of claim 14, further comprising a cooling tower in thermal communication with the intercooler and the aftercooler.

16. The compressed air energy storage system of claim 14, wherein the turbine train comprises:
a first gas expander coupled with the second rotary shaft, the first gas expander fluidly coupled with and disposed downstream from the combustor; and
a second gas expander coupled with the second rotary shaft, the second gas expander fluidly coupled with and disposed downstream from the first gas expander.

17. The compressed air energy storage system of claim 16, wherein the second gas expander is fluidly coupled with the recuperator and configured to direct an exhaust to the recuperator.

18. The compressed air energy storage system of claim 14, further comprising a booster compressor fluidly coupled with the combustor and configured to compress fuel and direct a compressed fuel to the combustor.

* * * * *